United States Patent [19]

Allport et al.

[11] Patent Number: 5,123,984
[45] Date of Patent: Jun. 23, 1992

[54] METHOD AND APPARATUS FOR FORMING PORTS IN DRIP IRRIGATION HOSE

[75] Inventors: Davies Allport, La Jolla; David Giuntoli; William F. Holzer, both of San Diego, all of Calif.

[73] Assignee: T-Systems International, Inc., San Diego, Calif.

[21] Appl. No.: 568,941

[22] Filed: Aug. 17, 1990

[51] Int. Cl.⁵ .................... B29C 53/48; B05B 15/00
[52] U.S. Cl. .................... 156/203; 156/252; 156/513; 239/542; 264/154
[58] Field of Search ............ 239/542, 547; 156/203, 156/252, 253, 267, 513, 209; 264/154–156, 284, 293; 138/42

[56] References Cited

U.S. PATENT DOCUMENTS

| | | | |
|---|---|---|---|
| 3,455,756 | 7/1969 | Mann | 156/252 |
| 4,009,832 | 3/1977 | Tiedt | 239/542 |
| 4,175,882 | 11/1979 | Gilead | 156/203 |
| 4,247,051 | 1/1981 | Allport | 239/542 |
| 4,272,473 | 6/1981 | Riemersma et al. | 264/154 |
| 4,572,756 | 2/1986 | Chapin | 156/203 |
| 4,626,130 | 12/1986 | Chapin | 239/542 |

Primary Examiner—Michael W. Ball
Assistant Examiner—Daniel J. Stemmer
Attorney, Agent, or Firm—Christie, Parker & Hale

[57] ABSTRACT

In a high speed method and apparatus for forming inlet and/or outlet ports in drip irrigation hose, the surface of one margin of a continuous length of plastic film is deformed without puncturing at periodic intervals along its length corresponding to the locations of the inlet and/or outlet ports to form protrusions from the film surface. Thereafter, the protrusions are severed from the film to form the ports. The remainder of the hose is made in a conventional fashion. Preferably, the film surface is deformed by directing the film through the nip of pair of rotating wheels. On the surface of one of the wheels is a series of blunt projections sized, shaped and positioned to correspond to the ports being formed. The protrusions are severed by the edge of a knife across which the film is directed.

23 Claims, 3 Drawing Sheets

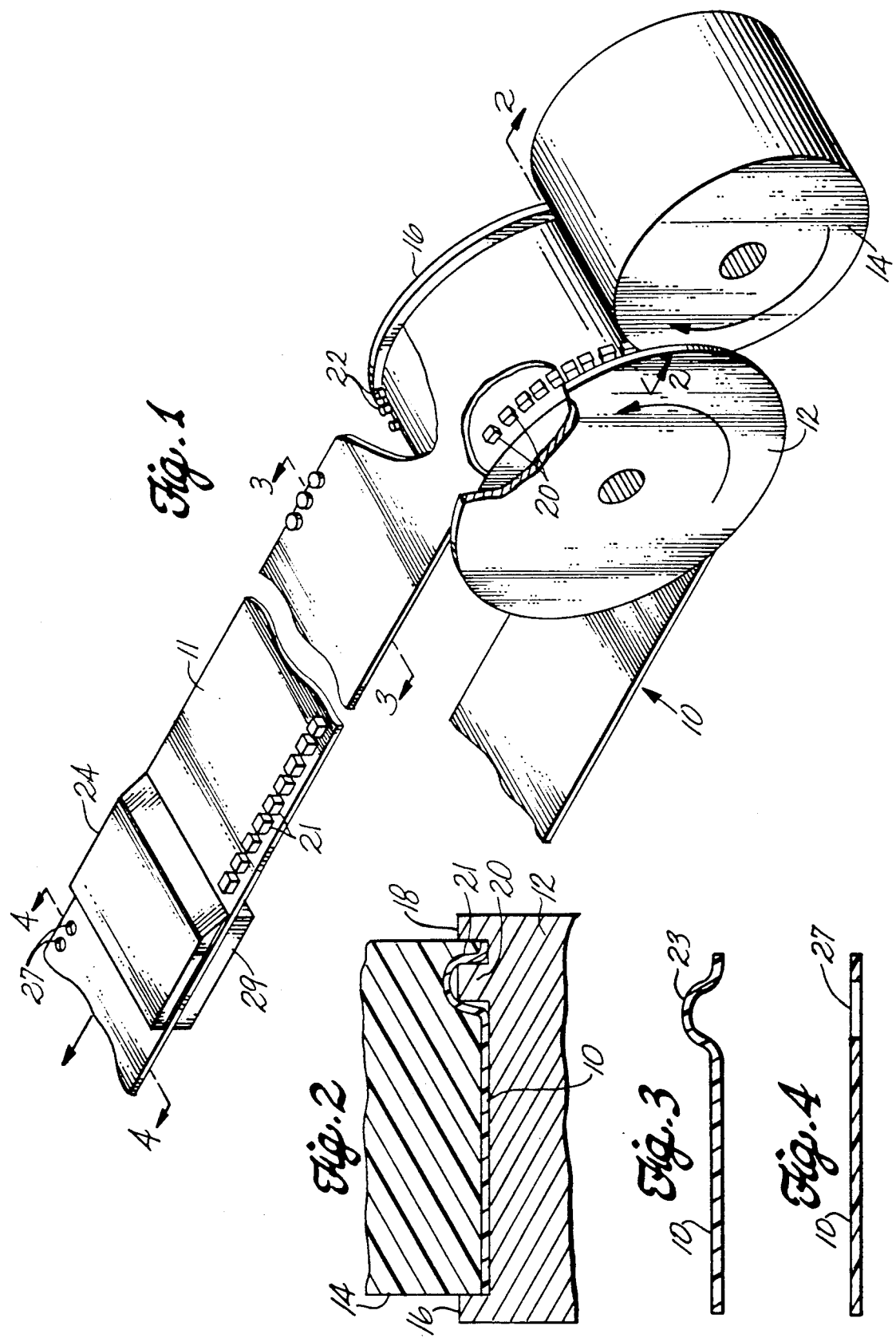

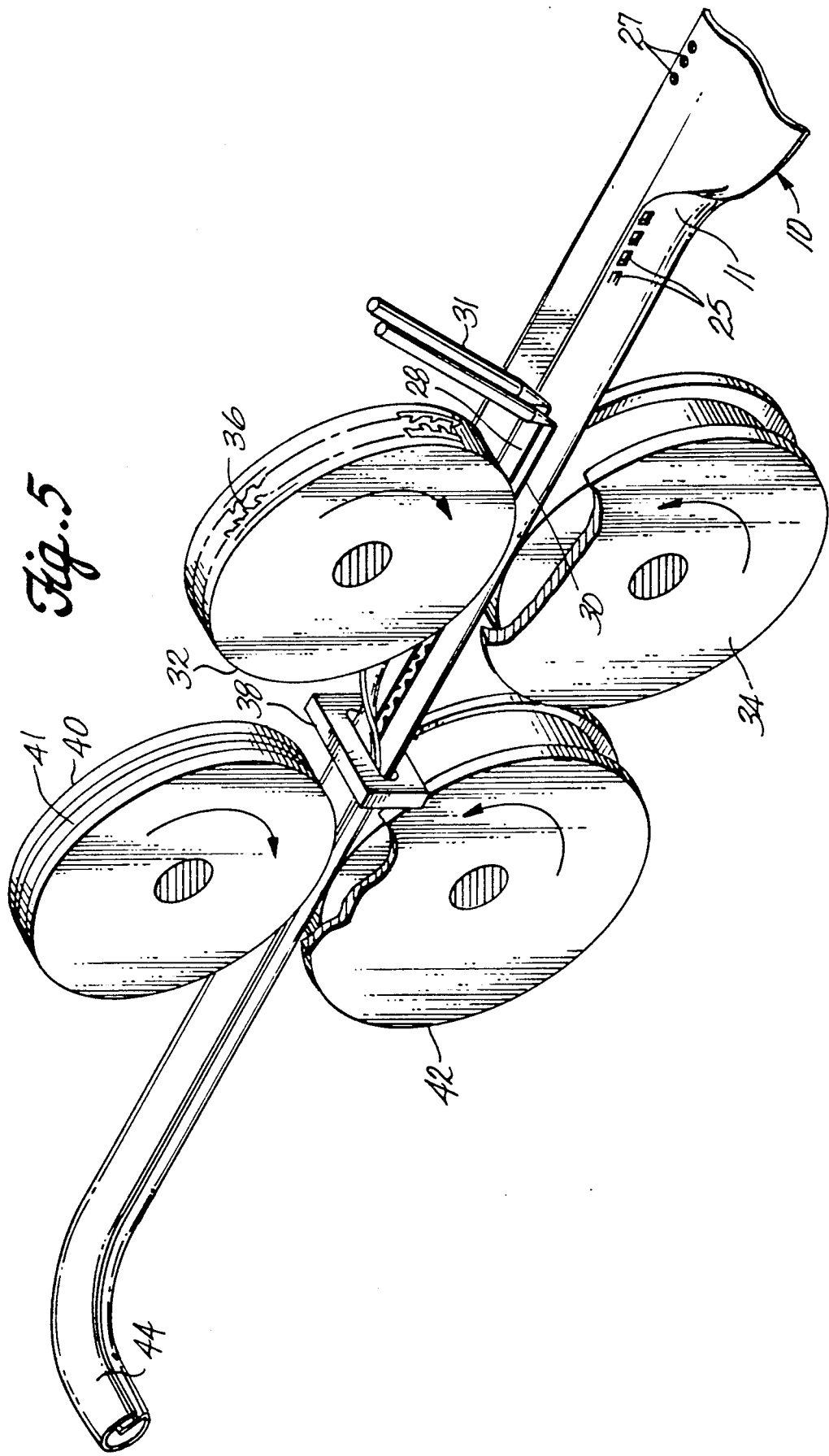

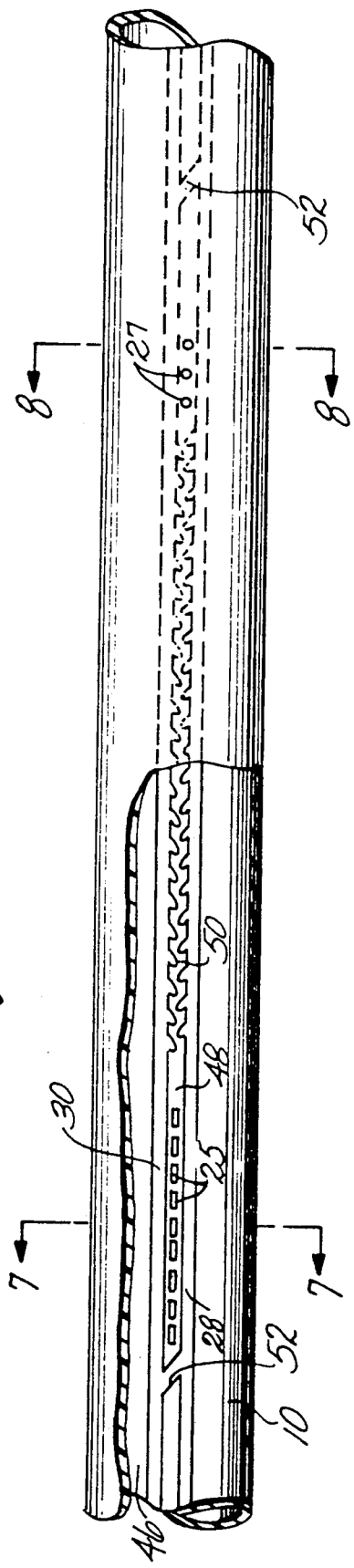
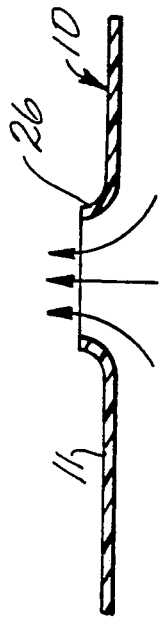
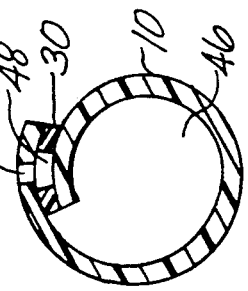
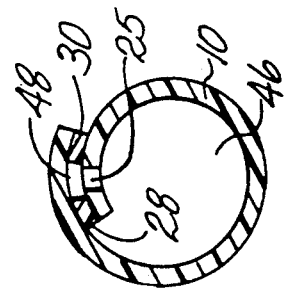

5,123,984

METHOD AND APPARATUS FOR FORMING PORTS IN DRIP IRRIGATION HOSE

BACKGROUND OF THE INVENTION

This invention relates to the manufacture of irrigation hose and, more particularly, to a high speed method and apparatus for forming inlet and/or outlet ports in drip irrigation hose.

One highly successful type of drip irrigation hose for use on row crops is made from an elongated plastic film and extruded plastic beads. The plastic film is folded to overlap its longitudinal margins to form a water supply passage. Two longitudinal side by side plastic beads interconnect the overlapping margins to define along their length a flow regulating passage. At regular intervals, a passage blocking cross bead is formed between the beads to divide the flow regulating passage into discrete segments. One or more inlet ports at one end of each segment couples the water supply passage to the flow regulating passage, and one or more outlet ports at the other end of each segment couples the flow regulating passage to the exterior of the hose.

The inlet and outlet ports are either created in the beads or in the film. In beads, the ports are formed by a molding wheel. In film, the ports are formed by various techniques, including a laser, a slit forming knife, a sharp edged, reciprocating hole punch that is driven against a rigid film backing surface or a reciprocating punch and die set.

Speed is an important consideration in the manufacture of drip irrigation hose. The rate of production is governed by the speed at which the manufacturing operations can be successfully performed. The currently known techniques for forming ports in the film are rather slow. Although the inlet and outlet ports can be formed in the beads by a molding wheel at high speed, this type of outlet port is particularly vulnerable to root intrusion, because roots tend to creep along the edge of the overlapping margins into the outlets. A root guard is sometimes used to prevent intrusion into the hose.

SUMMARY OF THE INVENTION

The invention is directed to a high speed method and apparatus for forming inlet and/or outlet ports in the film of drip irrigation hose. Specifically, the surface of one margin of a continuous length of plastic film is deformed without puncturing at periodic intervals along its length corresponding to the locations of inlet and/or outlet ports to form protrusions from the film surface. Thereafter, the protrusions are sliced from the film to form the ports. The remainder of the hose is made in a conventional fashion.

Preferably, the film surface is deformed by directing the film through the nip of pair of rotating wheels. On the surface of one of the wheels is a series of blunt projections sized, shaped and positioned to correspond to the ports being formed. These projections serve as male dies that stretch and permanently deform the plastic at the port locations. The other wheel either has a soft resilient surface or a series of females dies loosely mating with the protrusions in the one wheel to permit the film to stretch and permanently deform without puncturing. The permanently deformed protrusions from the film surface are sliced by the sharp edge of a knife blade across which the film is directed.

Inlet ports formed in this manner can be configured to minimize clogging and outlets ports formed in this manner can be configured to inhibit root intrusion because the shape of the ports is determined by the shape of the blunt projections. Furthermore the blade can be designed to slice the protrusions above the surface of the film, leaving a ridge around the resulting ports to aid filtration at the inlets and inhibit root intrusion at the outlets.

BRIEF DESCRIPTION OF THE DRAWINGS

The features of specific embodiments of the best mode contemplated of carrying out the invention are illustrated in the drawings, in which:

FIG. 1 is a schematic diagram of apparatus for forming inlet and outlet ports in accordance with the principles of the invention.

FIGS. 2, 3, and 4 are sectional views showing the plastic film in FIG. 1 at different stages of formation of the ports.

FIG. 5 is a schematic diagram of apparatus for completing the manufacture of a drip irrigation hose following the operations shown in FIG. 1.

FIG. 6 is a top, partially cut away view of a completed drip irrigation hose.

FIGS. 7 and 8 are side sectional views of the drip irrigation hose of FIG. 6 taken through planes 7—7 and 8—8 respectively.

FIG. 9 is a diagram illustrating a conical lip formed around the edge of one of the ports formed in accordance with the invention.

DETAILED DESCRIPTION OF THE SPECIFIC EMBODIMENT

In FIG. 1, a continuous elongated plastic film 10 is directed between the nip of a rotatable male die wheel 12 and a rotatable female die wheel 14. Wheel 12 has lateral film guiding flanges 16 and 18. Along one end, the periphery of wheel 12 has a set of blunt projections 20 corresponding in location, size shape and number to the inlet ports of the hose being manufactured. Along the other end, the periphery of wheel 12 has a set of protrusions 22 corresponding in location, size shape and number to the outlet ports of the hose being manufactured. As shown in FIG. 1, protrusions 20 and 22 are each clustered over only a portion of the surface of wheel 12 so as to correspond to the spacing between the sets of ports in the hose. The circumference of wheel 12 equals the spacing between successive sets of inlet ports and successive sets of outlet ports. Wheel 12 has a nonresilient, high friction surface with which film 10 makes substantially nonslipping contact. Wheel 14 preferably has a soft resilient surface that yields to projections 20 and 22 to permit them to permanently deform the surface of film 10 without puncturing it, thereby forming protrusions 21 and 23, respectively, extending from the surface 11 of film 10. Alternatively, wheel 14 could have a hard surface with openings into which projections 20 and 22 loosely fit. In either case, wheel 12 functions as a male die and wheel 14 functions as a female die to permanently deform film 10 at the locations where inlet and outlet ports are to be formed. After leaving wheel 12, the surface 11 of film 10 is directed past the cutting edge of a knife blade 24, which severs protrusions 21 and 23 near the surface of film 10 and forms openings 25 (FIG. 5) and 27 that comprise the inlet and outlet ports, respectively. Film 10 may be supported underneath knife blade 24 by a backup device 29 such as a plate or roller in order to facilitate the removal of protrusions 21. The spacing between knife 24 and its backup device 29 can either be held fixed or can be adjusted by biasing the film against the blade or the blade against the film, in order to compensate for variable film thickness, splices, or the like. The shape of the ports is determined by the cross sectional shape of projections 20 and 22. A very advantageous shape for the inlet ports is an elongated rectangle, for example, one thirty second of an inch by one eighth of an inch, because such an elongated shape inhibits clogging. An advantageous shape for the outlet ports is a circle.

Preferably, blade 24 slices the ends of the protrusions 21 and 23 above film surface 11 and, as shown in FIG. 9, film 10 is left with a ridge or lip 26 around the edge of the ports after the slicing step because of the permanent deformation imposed on film 10. Lip 26, which is conical in the case of ports 27, protrudes from film surface 11 outwardly of the hose to inhibit root intrusion into the outlet ports. In the case of inlet ports 25, lip 26 protrudes from film surface 11 toward the water supply passage to aid filtration.

In an alternative embodiment, blade 24 can be deactivated periodically, for example by lifting away from film surface 11, to increase the spacing between sets of inlets and/or outlets so such spacing is larger than the circumference of wheel 12.

Leaving knife edge 24, film 10 is turned over 180° so surface 11 is facing down as viewed in FIG. 5 and folded by a film guide, not shown, preparatory to passage under extrusion nozzles 31. The surface 11 and the lip 26 lie on the outside of the fold. Extrusion nozzles 31 deposit a pair of spaced apart longitudinal beads 28 and 30 on the internal overlapping margin of film 10. Film 10 then passes through the nip of a rotating molding wheel 32 and a backing wheel 34. Molding wheel 32 has a pattern of depressions 36 corresponding to the desired bead pattern on the hose. In the nip of wheels 32 and 34, beads 28 and 30 are shaped by molding wheel 32 to form repeatably on film 10 the desired bead pattern, after which the external overlapping margin of film 10 is folded by a guide 38 to overlap the internal overlapping margin of film 10. As a final step, the overlapped film 10 passes through the nip of a form wheel 40 and a backing wheel 42. Form wheel 40 has a groove 41 that depresses the beads formed by beads 28 and 30 to set the bead height at a specified value that determines the flow rate of the hose.

During the described process, film 10 is continuously transported by conventional means not shown. For example, the disclosed wheels could be driven or other drive wheels could be provided.

The finished drip irrigation hose 44 as it leaves wheels 40 and 42 is shown in detail in FIGS. 6, 7 and 8. The water from the supply passage, designated 46, flows through inlet ports 25 to the flow regulating passage, designated 48. Filtration of the inflowing water is aided by lip 26 around inlet ports 25. Flow regulating passage 48 is formed from molded beads 28 and 30. The water flows through a turbulent flow section 50 formed in flow regulating passage 48 by teeth-like weirs separated by turbulence inducing pockets in the flow path. The pockets in one bead are aligned with the weirs in the other bead. After all the line pressure has been dissipated in the turbulent flow section 50, water flows from outlet ports 27 to the exterior of the hose. Because the outer surface of the hose has lip 26 around outlet ports 27, root intrusion is discouraged. Regulating passage 48 is divided into segments by cross beads 52 that join beads 28 and 30. As a result, each segment has a series of inlets ports 25, a turbulent flow section 50, and a series of outlet ports 27. Molded beads 28 and 30, including the turbulent flow section and cross beads 52, are formed by the pattern on molding wheel 32.

The described embodiment of the invention is only considered to be preferred and illustrative of the inventive concept; the scope of the invention is not to be restricted to such embodiments. Various and numerous other arrangements may be devised by one skilled in the art without departing from the spirit and scope of this invention. For example, although the inlet ports and outlet ports are both formed by permanent deformation and severance of the resulting protrusions, it may be desirable under some circumstances to form either the inlet ports or the outlet ports by interrupting the beads. In such case, the ports in the beads would be formed by the pattern on molding wheel 32 (FIG. 5). Further, although it is preferable to permanently deform the film to form the protrusions with male and female die wheels, reciprocating die parts could also be used. Moreover, although it is preferable to form the ports in two operations, first permanently deforming and then severing the protrusions, the invention also contemplates using male and female die wheels to deform and sever in a single operation; in such case, the projections on the male die wheel have a sharp, rather than blunt edge on their ends capable of puncturing the film when it contacts a rigid surface on the female die surface. In other words, the severing operation is executed by the sharp edge and the rigid surface of the die wheels. Another alternative is to have a reciprocating sharp edged punch and a stationary die female with a large entrance and a smaller base; as the punch moves into the entrance it stretches and permanently deforms the film to form a protrusion and as the punch enters the base the protrusion is severed because of the tight fit with the side wall of the die.

What is claimed is:

1. A method for making drip irrigation hose from a continuous length of plastic film having first and second longitudinal margins, the hose having a large water supply passage, a small flow regulating passage, sets of inlet ports from the supply passage to the regulating passage, and sets of outlet ports from the regulating passage to the exterior of the hose, the method comprising the steps of:

deforming without puncturing the surface of one margin of the film at periodic intervals along its length corresponding to the location of one of the sets of ports to form spaced apart clusters of protrusions from the surface of the one margin;

slicing the ends of the protrusions from the film to form the one set of ports;

forming the other set of ports;

folding the film along its length to overlap the margins so the second margin is external and the first margin is internal; and sealing the overlapping margins on both sides of the inlets and outlets along the length of the film to form the regulating passage between the overlapping margins from which water can flow through the outlets to the exterior of the hose and the supply passage within the remainder of the film from which water can flow through the inlet ports to the regulating passage.

2. The method of claim 1, additionally comprising the step of continuously transporting the length of film during the deforming, slicing, forming, folding, and sealing steps.

3. The method of claim 2, in which the deforming steps comprise directing the length of film in substantially nonslipping contact with a rotating wheel that has clustered on only a portion of its periphery blunt projections that deform the film to form the protrusions from its surface, the periodic intervals being repeated for each revolution of the wheel.

4. The method of claim 3, in which the slicing step comprises directing the surface of the length of film with the protrusions over a sharp knife edge that cuts off the ends of the protrusions.

5. The method of claim 4, in which the knife edge is formed on a knife, the slicing step comprising: orienting the knife to lie parallel to the surface of the film, and pivotally mounting the knife to bear on the surface of the film so the knife edge is free to adjust to changes in thickness of the film.

6. The method of claim 5, in which the knife is mounted above the film so the force of gravity biases the knife against the surface of the film.

7. The method of claim 2, in which the slicing step comprises directing the surface of the length of film with the protrusions over a sharp knife edge that cuts off the ends of the protrusions.

8. The method of claim 7, in which the knife edge is formed on a knife, the slicing step comprising: orienting the knife to lie parallel to the surface of the film so that knife edge is free to adjust to of the film, and pivotally mounting the knife to bear on the changes in thickness of the film.

9. The method of claim 8, in which the knife is mounted above the film so the force of gravity biases the knife against the surface of the film.

10. The method of claim 6, in which the sealing step comprises:
forming along the length of one of the margins longitudinal adhesive beads on both sides of the inlets and outlets before completing the folding step; and
directing both margins through the nip of a pair of forming wheels to seal the beads to the margins and set the bead height after completing the folding step.

11. The method of claim 10, in which the bead forming step forms at least one uninterrupted longitudinal bead and a cross bead joining the longitudinal beads between each inlet and a corresponding outlet.

12. The method of claim 11, in which the bead forming step additionally forms teeth like weirs separated by pockets on the inside of the beads, the weirs in one bead being aligned with the pockets in the other bead.

13. The method of claim 12, in which the bead forming step comprises: extruding two adhesive beads onto the surface of the one margin of the film; and directing the adhesive beads and the one margin into substantially nonslipping contact with a rotating wheel that has on its periphery an indented pattern that molds the beads to form the beads.

14. The method of claim 1, in which the forming step comprises:
deforming without puncturing the surface of the other margin of the film at periodic intervals along its length corresponding to the location of the other set of ports to form protrusions from the surface of the other margin; and
slicing the ends of the protrusions from the film to form the other set of ports.

15. The method of claim 14, in which the slicing step comprises:
directing the surface of the length of film with the protrusions on the other margin over a sharp knife edge that cuts off the ends of such protrusions.

16. The method of claim 4, in which the knife edge is periodically lifted off the surface of the film to increase the spacing between ports.

17. The method of claim 4, in which the knife edge is so adjusted to cut off the ends of all the protrusions.

18. A method of making a drip irrigation hose from a continuous strip of plastic film, the method comprising the steps of:
permanently deforming without puncturing the surface of the film at periodic intervals along its length corresponding to the location of outlets of the hose to form protrusions from the surface of the film;
directing the surface of the length of film with the protrusions over a sharp knife edge that cuts off the ends of the protrusions thereby slicing the protrusions from the film to form outlets;
folding the film along its length to adjoin its margins; and
sealing the adjoined margins along the length of the film so that only egress for water flow from the folded film is through the outlets.

19. The method of claim 18, additionally comprising the step of continuously transporting the length of film during the deforming, slicing, folding, and sealing steps.

20. The method of claim 19, in which the deforming step comprises directing the length of film in substantially nonslipping contact with a rotating wheel that has on its periphery blunt projections that deform the film to form the protrusions from its surface, the periodic intervals being repeated for each revolution of the wheel.

21. The method of claim 20, in which the slicing step comprises directing the surface of the length of film with the protrusions over a sharp knife edge that cuts off the ends of the protrusions.

22. The method of claim 18, in which the directing step comprises directing the surface of the length of film with the protrusion over the sharp knife edge such that the outlets are countersunk.

23. The method of claim 18, in which the knife edge is so adjusted to slice the ends of all the protrusions.

* * * * *

UNITED STATES PATENT AND TRADEMARK OFFICE
CERTIFICATE OF CORRECTION

PATENT NO.  : 5,123,984
DATED       : June 23, 1992
INVENTOR(S) : Davies Allport; David Giuntoli; William F. Holzer It is certified that error appears in the above-identified patent and that said Letters Patent is hereby corrected as shown below:

Column 5, lines 31-33, (claim 8), on line 31, after "surface" (first occurrence) insert the phrase -- of the film, and pivotally mounting the knife to bear on the -- and delete this phrase on lines 32,33.

Column 5, line 32 (claim 8), before "knife" change "that" to -- the --.

Signed and Sealed this

Seventeenth Day of August, 1993

Attest:

BRUCE LEHMAN

*Attesting Officer*    Commissioner of Patents and Trademarks